(12) United States Patent
Graham et al.

(10) Patent No.: US 7,096,424 B2
(45) Date of Patent: *Aug. 22, 2006

(54) AUTOMATIC ADAPTIVE DOCUMENT PRINTING HELP SYSTEM

(75) Inventors: Jamey Graham, Los Altos, CA (US); Peter E. Hart, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 369 days.

This patent is subject to a terminal disclaimer.

(21) Appl. No.: 10/402,844

(22) Filed: Mar. 28, 2003

(65) Prior Publication Data

US 2004/0083431 A1    Apr. 29, 2004

Related U.S. Application Data

(63) Continuation of application No. 09/149,920, filed on Sep. 9, 1998, now Pat. No. 6,582,475.

(51) Int. Cl.
*G06F 15/00* (2006.01)
*G06F 17/00* (2006.01)

(52) U.S. Cl. .............. 715/526; 715/512; 715/513; 707/2; 707/3; 707/4

(58) Field of Classification Search ........ 715/512–513, 715/526; 707/2–4
See application file for complete search history.

(56) References Cited

U.S. PATENT DOCUMENTS

| | | | |
|---|---|---|---|
| 4,417,239 A | 11/1983 | Demke et al. |
| 4,823,303 A | 4/1989 | Terasawa |
| 5,153,831 A | 10/1992 | Yianilos |
| 5,309,359 A | 5/1994 | Katz et al. |
| 5,349,658 A | 9/1994 | O'Rourke et al. |
| 5,384,703 A | 1/1995 | Withgott et al. |
| 5,404,295 A | 4/1995 | Katz et al. |
| 5,418,948 A | 5/1995 | Turtle |
| 5,442,795 A | 8/1995 | Levine et al. |
| 5,479,600 A | 12/1995 | Wroblewski et al. |
| 5,481,666 A | 1/1996 | Nguyen et al. |
| 5,530,942 A | 6/1996 | Tzou et al. |
| 5,546,502 A | 8/1996 | Hart et al. |
| 5,596,700 A | 1/1997 | Darnell et al. |

(Continued)

FOREIGN PATENT DOCUMENTS

EP    378 848 A2    7/1990

(Continued)

OTHER PUBLICATIONS

Acrobat Reader (software application) Version 2.0, 1994 Adobe Systems Incorporated, screenshots, Figures 1-10.*

(Continued)

*Primary Examiner*—William Bashore
(74) *Attorney, Agent, or Firm*—Townsend and Townsend and Crew LLP

(57) ABSTRACT

An automatic printing assistant application for documents in electronic form is provided by virtue of the present invention. In certain embodiments, an elongated thumbnail image of all or part of an electronically stored document is displayed. A section of the document of interest to the reader is emphasized. Movement of the emphasized area in the elongated thumbnail image assists the user with the selection of sections or pages of the document for printing. The operation of the assistant is personalizable for a particular user by setting of a sensitivity level and selection of relevant topics of interest. Some embodiments of the assistant are also capable of improved performance over time by both automatic and manual feedback. The assistant is usable with many popular electronic document formats.

3 Claims, 13 Drawing Sheets

U.S. PATENT DOCUMENTS

| | | | |
|---|---|---|---|
| 5,638,543 | A | 6/1997 | Pedersen et al. |
| 5,680,636 | A | 10/1997 | Levine et al. |
| 5,694,559 | A | 12/1997 | Hobson et al. |
| 5,721,897 | A | 2/1998 | Rubinstein et al. |
| 5,721,902 | A | 2/1998 | Schultz |
| 5,737,599 | A | 4/1998 | Rowe et al. |
| 5,748,805 | A | 5/1998 | Withgott et al. |
| 5,751,283 | A | 5/1998 | Smith |
| 5,751,287 | A | 5/1998 | Hahn et al. |
| D395,297 | S | 6/1998 | Cheng et al. |
| 5,761,655 | A | 6/1998 | Hoffman |
| 5,768,578 | A | 6/1998 | Kirk et al. |
| 5,778,397 | A | 7/1998 | Kupiec et al. |
| 5,781,785 | A | 7/1998 | Rowe et al. |
| 5,784,616 | A | 7/1998 | Horvitz |
| D398,299 | S | 9/1998 | Ballay et al. |
| 5,806,079 | A | 9/1998 | Rivette et al. |
| D400,195 | S | 10/1998 | Utesch |
| 5,818,446 | A | 10/1998 | Bertram et al. |
| 5,819,301 | A | 10/1998 | Rowe et al. |
| D400,520 | S | 11/1998 | Baker et al. |
| 5,832,474 | A | 11/1998 | Lopresti et al. |
| 5,838,317 | A | 11/1998 | Bolnick et al. |
| 5,838,323 | A | 11/1998 | Rose et al. |
| 5,847,709 | A | 12/1998 | Card et al. |
| 5,857,185 | A | 1/1999 | Yamamura |
| 5,860,074 | A | 1/1999 | Rowe et al. |
| 5,870,770 | A | 2/1999 | Wolfe |
| 5,873,107 | A | 2/1999 | Borovoy et al. |
| 5,933,841 | A | 8/1999 | Schumacher et al. |
| 5,943,679 | A | 8/1999 | Niles et al. |
| 5,946,678 | A | 8/1999 | Aalbersberg |
| 5,950,187 | A | 9/1999 | Tsuda |
| 5,987,454 | A | 11/1999 | Hobbs |
| 6,006,218 | A | 12/1999 | Breese et al. |
| D418,826 | S | 1/2000 | Pavely et al. |
| D419,144 | S | 1/2000 | Baker et al. |
| 6,021,403 | A | 2/2000 | Horvitz et al. |
| 6,026,409 | A | 2/2000 | Blumenthal |
| 6,028,601 | A | 2/2000 | Machiraju et al. |
| 6,055,542 | A | 4/2000 | Nielsen et al. |
| D424,036 | S | 5/2000 | Arora et al. |
| D425,039 | S | 5/2000 | Shields |
| D425,497 | S | 5/2000 | Eisenberg et al. |
| 6,057,839 | A | 5/2000 | Advani et al. |
| 6,058,202 | A | 5/2000 | Yamaguchi |
| 6,094,648 | A | 7/2000 | Aalbersberg et al. |
| 6,101,503 | A | 8/2000 | Cooper et al. |
| 6,122,647 | A * | 9/2000 | Horowitz et al. ........... 715/513 |
| 6,131,092 | A | 10/2000 | Masand |
| D435,561 | S | 12/2000 | Pettigrew et al. |
| 6,182,090 | B1 | 1/2001 | Peairs |
| D439,585 | S | 3/2001 | Law et al. |
| 6,222,547 | B1 | 4/2001 | Schwuttke et al. |
| D445,802 | S | 7/2001 | Greminger |
| 6,259,458 | B1 | 7/2001 | Theisen et al. |
| 6,275,229 | B1 | 8/2001 | Weiner et al. |
| D449,050 | S | 10/2001 | Graham |
| 6,335,730 | B1 | 1/2002 | Gould |
| 6,339,437 | B1 | 1/2002 | Nielsen |
| 6,369,811 | B1 | 4/2002 | Graham et al. |
| D456,817 | S | 5/2002 | Graham |
| 6,457,026 | B1 | 9/2002 | Graham et al. |
| 6,553,373 | B1 | 4/2003 | Boguraev et al. |
| 6,582,475 | B1 * | 6/2003 | Graham et al. ............. 715/513 |
| 6,681,370 | B1 | 1/2004 | Gounares et al. |
| 2002/0065814 | A1 | 5/2002 | Okamoto et al. |
| 2003/0051214 | A1 | 3/2003 | Graham et al. |

FOREIGN PATENT DOCUMENTS

| | | |
|---|---|---|
| EP | 0459174 A2 | 12/1991 |
| EP | 737 927 A2 | 10/1996 |
| EP | 762 297 A2 | 3/1997 |
| EP | 802 492 A1 | 10/1997 |
| GB | 2156118 A | 10/1985 |
| GB | 2234609 A | 2/1991 |
| GB | 2137788 A | 10/1994 |
| GB | 2290898 | 1/1996 |
| GB | 2 332 544 A | 6/1999 |
| JP | 02-001057 | 1/1990 |
| JP | 06-203024 | 7/1994 |
| JP | 08-255163 | 10/1996 |
| JP | 8-297677 A | 11/1996 |
| JP | 11-213011 | 8/1999 |
| WO | WO 97/12328 A1 | 4/1997 |

OTHER PUBLICATIONS

Adobe Systems, Inc., "Adobe Photoshop 4.0 User Guide for Macintosh and Windows," 1996, Title Page, Copyright Page, Chap. 2, pp. 30-31.

Adobe Acrobat Reader 3.0 screen dumps (fig. 1-3), (1996).

Acrobat Reader Version 2.0 (software application), Adobe Systems Incorporated, screenshots Figures 1-10 (1994).

Apple Macintosh system 7 reference manual, pp. 30-31 (1991).

Boguraev et al., "Salience-Based Content Characterisation of Text Documents," *Proceedings of the ACL/EACL Workshop on Intellegent [Sic] Scalable Text Summarization*, 1997. Topic identification, Discourse-based summarization. pp. 1-12.

Brandow et al., "Automatic Condensation of Electronic Publications by Sentence Selection," *Information Processing and Management*, 31(5):675-685 (1995).

Gliedman, J., "Virtual Office Managers," *Computer Shopper*, 18(9):290 (1998).

Greenberg, et al., "Sharing fisheye views in relaxed-WYSIWIS groupware applications," *Proceedings of Graphics Interface*, Toronto, Canada, May 22-24, 1995, Distributed by Morgan-Kaufmann, pp. 28-38, http://www.cpsc.ucalgary.ca/grouplab/papers/1996/96-Fisheye.GI/gi96_fisheye.html.

Hearst et al., "TileBars: Visualization of Term Distribution Information in Full Text Information Access," *Proceedings of the ACM SIGCHI Conference on Human Factors in Computing Systems (CHI)*, Denver, CO., May 1995, pp. 1-8, http://www.acm.org/sigchi/chi95/Electronic/documnts/papers/mah_bdy_htm.

Langley, P., "An Analysis of Bayesian Classifiers," *Proceedings of 10th National Conference on Artifical Intelligence*, pp. 223-228 (1992).

Langley, P., "Induction of Selective Bayesian Classifiers," *Proceedings of 10th National Conference on Uncertainty in Artifical Intelligence*, pp. 400-406 (1994).

Manber, U., "The Use of Customized Emphasis in Text Visualization," *Proceedings of 1997 IEEE Conf. on Information Visualization*, pp. 132-138, held Aug. 27-29, 1997 in London England.

Schweighofer et al., "The Automatic Generation of Hypertext Links in Legal Documents," *Lecture Notes in Computer Science*, vol. 1134, Wagner et al., eds., from 7th Int. Conf., DEXA 96', held Sep. 1996 in Zurich, Switzerland (1996).

Sumita et al., "Document Structure Extraction for Interactive Dcoument Retrieval Systems," *Proceedings of SIGDOC 93*, pp. 301-310, held Oct. 5-8, 1993 in Kitchner, Ontario.

Taghva et al., "An Evolution of an Automatic Markup System," *SPIE*, 2422:317-327.

Taxt, T., "Segmentation of Document Images," *IEEE*, 11(12):1322-1329 (1989).

Ball et al., "Software Visualization in the Large", *IEEE Computer*, 29(4): 33-43 (Apr. 1996).

Hill et al., "Edit Wear and Read Wear", *ACM*, pp. 3-9 (May 3-7, 1992).

Begole et al., "Supporting Worker Independence in Collaboration Transparency," doc. ID: ncstrl.vatech_cs/TR-98-12, Virginia Polytechnic Institute and State University (1994).

Begole et al., "Flexible Collaboration Transparency," doc. ID: ncstrl.vatech_cs/TR-98-11, Virginia Polytechnic Institute and State University (1998).

Byrd, D., "A Scrollbar-based Visualization for Document Navigation," doc. ID: xxx.cs.IR/9902028, Computing Research Repository Information Retrieval (1999).

"Flexible JAMM Screenshots," downloaded from internet site http://simon.cs.ct.edu/-jamm May 4, 2000.

IBM Technical Disclosure Bullitan, "Quick Selection of Window Environment Coordinates," 35:57-60, ISS # 4B, (1992).

Lam et al. "Automatic document classification based on probabilistic reasoning: model and performance analysis,"IEEE 3:2719-2723 (1997).

"Quick Selection of Window Environment Coordinates." *IBM Technical Disclosure Bulletin*, vol. 35, pp. 57-60, (Sep. 1, 1992).

WordPerfect 6.1 for Windows,, Apr. 15, 1996 Corel Corporation, Application screenshots pp. 1-4.

Adobe Systems Incorporated, Acrobat Reader, 1999, Adobe Systems Incorporated, Version 4.0.

Balasubramanian, V., *State of the Art Review on Hypermedia Issues And Applications*, chapter 5—Information Retrieval Issues, E-Papyrus, Inc., Apr. 1998 (downloaded from website on Dec. 15, 2004) on the internet: <http://www.e-papyrus.com/hypertext_review/index.html>.

Hart, Peter E., and Graham, Jamey, Query-Free Information Retrieval, Oct. 1997, IEEE Cooperative Information Systems, (pp. 32-37).

Shneiderman, B., "Dynamic Queries for Visual Information Seeking," pp. 236-243 from *Readings in Information Visualization, Using Vision to Think*, Card et al., Eds., Morgan Kaufman Publishers, Jan. 25, 1999.

* cited by examiner

1006 <RH.ANOH.S NUMBER=4>
We have approached this challenge by introducing an
<RH.ANOH CONCEPT="Intelligent Agents" SUBCONCEPT=" intelligent agent" SEN-
TENCE="4" NUMBER=1>intelligent agent </RH.ANOH> that analyzes interactions
between user and<RH.ANOH CONCEPT="Bayes Inference" SUBCONCEPT=" expert system"
SENTENCE="4" NUMBER=3>expert system</RH.ANOH> and automatically constructs
database queries base on this analysis</RH.ANOH.S>. The user is unobtrusively
notified when information relevant to the current diagnostic context has been
returned, and may immediately access it if desired. From the user's perspec-
tive all database machinery is entirely transparent, indeed no formal query
language is even made available. Hence we term this approach query-free infor-
mation retrieval. <p>

1006 <RH.ANOH.S NUMBER=5>
As we hope will be apparent from what follows, the introduction of the
<RH.ANOH CONCEPT="Intelligent Agents" SUBCONCEPT=" intelligent agent" SEN-
TENCE="5" NUMBER=2>intelligent agent </RH.ANOH> additionally offers one solu-
tion to a fundamental problem facing designers of cooperative information
systems: How can legacy systems of substantial complexity be integrated within
a larger system context</RH.ANOH.S>? By requiring that all interactions with
the legacy database be mediated by the agent, we have been able to isolate the
database system cleanly while still supporting query-free information
retrieval. <p>

1006 <RH.ANOH.S NUMBER=6>
FIXIT is comprised of the three subsystems already mentioned: the probabilistic
<RH.ANOH CONCEPT="Bayea Inference" SUBCONCEPT=" expert system" SENTENCE="6"
NUMBER=4>expert system </RH.ANOH>, the legacy full-text database system (to
which we added a new, semantically-based, indexing structure that supports lim-
ited <RH.ANOH CONCEPT="Natural Language" SUBCONCEPT=" natural language" SEN-
TENCE="6" NUMBER=1>natural language </RH.ANOH> queries), and the <RH.ANOH CON-
CEPT="Intelligent Agents" SUBCONCEPT=" intelligent agent" SENTENCE="6" NUM-
BER=3>intelligent agent </RH.ANOH> that effectively integrates
them<RH.ANOH.S>. The following sections describe these system components, pro-
vide implementation details, illustrate the runtime behavior of FIXIT, report
1004 on operational experience, and close with some observations about query-free
information retrieval and the potential for generalizing the underlying para-
digm.<p>

<h2> FIXIT's System Components</h2>
We first describe the probabilistic expert sub-system and the information
retrieval sub-system. Before briefly describing these, we stress that our pur-
pose was not necessarily to advance the capabilities of the individual compo-
nents or indeed even to exploit fully the best current technology; instead, we
focus on their integration.<p>
<p>

FIG. 10

AUTOMATIC ADAPTIVE DOCUMENT PRINTING HELP SYSTEM

CROSS-REFERENCE TO RELATED APPLICATIONS

This application is a continuation 09/149,920 filed Sep. 9, 1998 of U.S. Pat. No. 6,582,475, issued Jun. 24, 2003 entitled, AUTOMATIC ADAPTIVE DOCUMENT DISPLAY AND PRINTING HELP SYSTEM UTILIZING CONCEPTS OF INTEREST AND REDUCED IMAGES.

This application is related to U.S. Pat. No. 6,369,811, issued Apr. 9, 2002, entitled. AUTOMATIC ADAPTIVE DOCUMENT HELP FOR PAPER DOCUMENTS and now abandoned U.S. patent application Ser. No. 08/995,616, filed Dec. 22, 1997, entitled AUTOMATIC ADAPTIVE DOCUMENT HELP SYSTEM.

All of the above applications are hereby incorporated by reference, as if set forth in full in this document, for all purposes.

BACKGROUND OF THE INVENTION

The present invention relates to printing of electronic documents and more particularly to method and apparatus for augmenting the printing of electronic documents with features to enhance the experience of reading or using the hardcopy of an electronic document.

Increasingly, readers of documents are being called upon to assimilate vast quantities of information in a short period of time. To meet the demands placed upon them, readers find they must read documents "horizontally," rather than "vertically," i.e., they must scan, skim, and browse sections of interest in multiple documents rather than read and analyze a single document from beginning to end.

Documents are becoming more widely available in electronic form. Some documents are available electronically by virtue of their having been created using word processing software. Other electronic documents are accessible via the Internet. Yet others may become available in electronic form by virtue of being scanned in, copied, or faxed. Commonly assigned U.S. application Ser. No. 08/754,721, entitled AUTOMATIC AND TRANSPARENT DOCUMENT ARCHIVING, the contents of which are incorporated herein by reference for all purposes, details a system for generating electronic as well as hardcopy format of documents.

However, the mere availability of documents in electronic form does not assist the reader in confronting the challenges of assimilating information quickly. Indeed, many time-challenged readers still prefer paper documents because of their portability and the ease of flipping through pages.

Certain tools take advantage of the electronic form documents to assist harried readers. Tools exist to search for documents both on the Internet and locally. Once a document is identified and retrieved, automatic summarization techniques, such as the Reader's Helper™, described in a commonly owned copending U.S. patent application Ser. No. 08/995,616, entitled AUTOMATIC ADAPTIVE DOCUMENT HELP SYSTEM, the contents of which are incorporated herein by reference for all purposes, helps the reader to find as well as assimilate the information he or she wants more quickly. However, there is heretofore no automatic assistance available to the reader who desires to work with printed hardcopy of electronic documents.

What is needed is a document printing system that helps the reader print the information he or she wants more quickly. The document printing system should be easily personalizable, flexible and adaptive as well.

SUMMARY OF THE INVENTION

An automatic printing assistant application for documents in electronic form is provided by virtue of the present invention. In certain embodiments, an elongated thumbnail image of all or part of an electronically stored document is displayed. A section of the document of interest to the reader is emphasized. Movement of the emphasized area in the elongated thumbnail image assists the user with the selection of sections or pages of the document for printing. The operation of the assistant is personalizable for a particular user by setting of a sensitivity level and selection of relevant topics of interest. Some embodiments of the assistant are also capable of improved performance over time by both automatic and manual feedback. The assistant is usable with many popular electronic document formats.

In accordance with a first aspect of the present invention, a method for adaptively controlling printing of an electronically stored document includes a step of accepting user input indicating a user-specified concept of interest. A step of analyzing the electronically stored document to identify locations of discussion of the user-specified concept of interest may also be included. Embodiments can also include a step of displaying visual indications of the identified locations. In another step, user input indicating a print preference for certain locations is accepted. Finally, portions of the electronic document corresponding to the user's print preferences are printed.

In accordance with a second aspect of the present invention, the method for assisting a reader in printing an electronically stored document also includes a step of accepting user input indicating a print preference by emphasizing an area of interest to the user in a thumbnail image corresponding to a section of interest to the user in the document. The user can control printing by sliding the emphasized area through thumbnail image for the purposes of indicating sections of the electronically stored document to print.

In select embodiments in accordance with the present invention, the method includes a step of displaying an elongated thumbnail image of a portion of the electronically stored document in a viewing area of a display.

In certain embodiments in accordance with the present invention, the step of analyzing the electronically stored document to identify locations of discussion of the user-specified concept of interest may be realized by exploiting a probabilistic inference method, such as a Bayesian belief network or its equivalent to identify such locations.

Numerous benefits are achieved by way of the present invention over conventional techniques. In some embodiments, the present invention is more user friendly than conventional techniques. The present invention can provide a way for the user to obtain hardcopy of only those sections of a large document which contain concepts of interest. Some embodiments according to the invention are more robust than known techniques. These and other benefits are described throughout the present specification and more particularly below.

A further understanding of the nature and advantages of the inventions herein may be realized by reference to the remaining portions of the specification and the attached drawings.

BRIEF DESCRIPTION OF THE DRAWINGS

FIG. 10 depicts a portion of an HTML document processed in accordance with one embodiment of the present invention.

DESCRIPTION OF SPECIFIC EMBODIMENTS

The present invention provides a personalizable system for printing automatically annotated documents based upon concepts of interest to a particular user. An embodiment according to the present invention has been reduced to practice under the name Reader's Helper™.

Computer System Usable for Implementing the Present Invention

Figure 1:
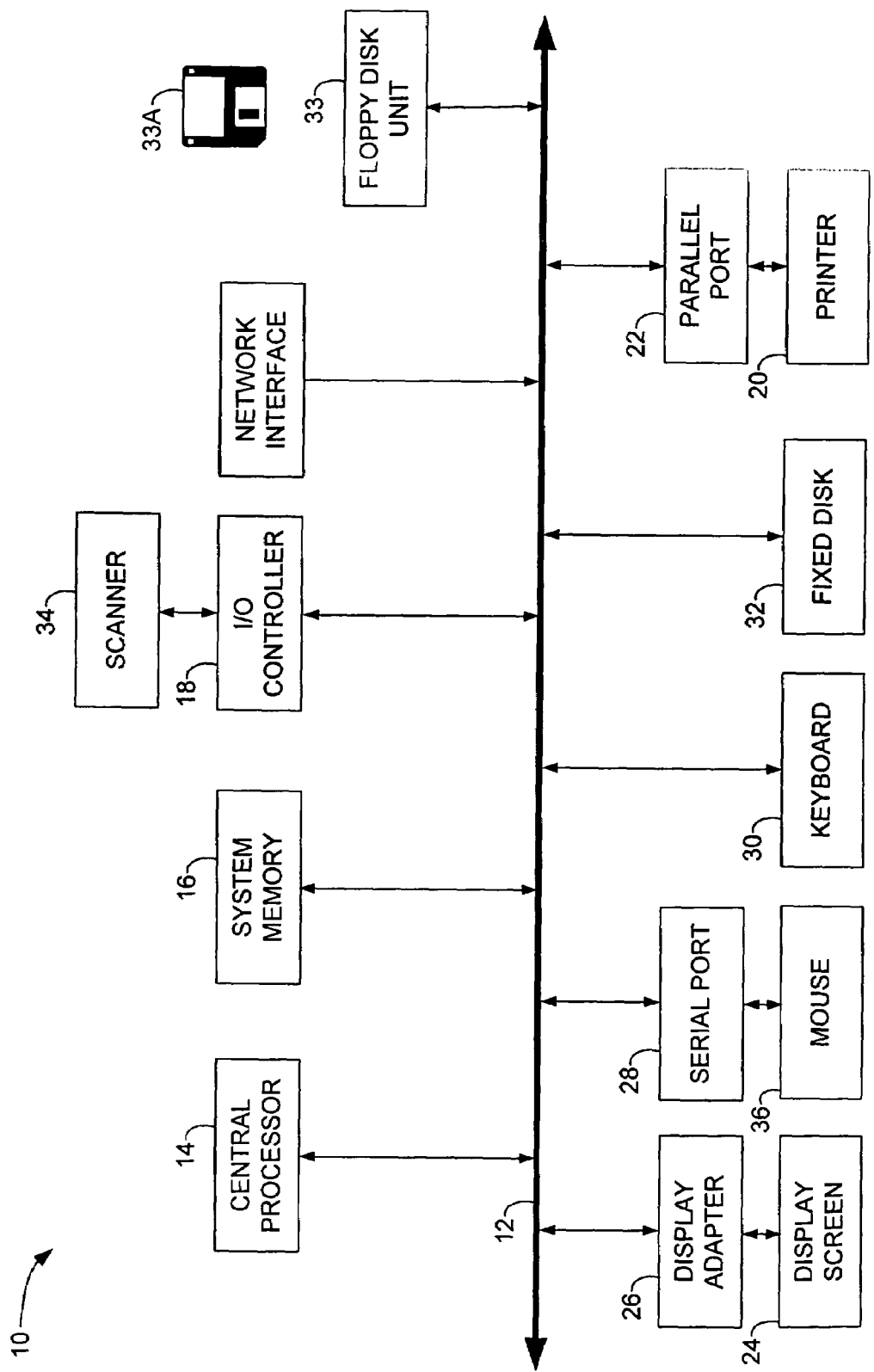
FIG. 1 depicts a representative computer system suitable for implementing the present invention.

FIG. 1 depicts a representative computer system suitable for implementing the present invention. FIG. 1 shows basic subsystems of a computer system 10 suitable for use with the present invention. In FIG. 1, computer system 10 includes a bus 12 which interconnects major subsystems such as a central processor 14, a system memory 16, an input/output controller 18, an external device such as a printer 20 via a parallel port 22, a display screen 24 via a display adapter 26, a serial port 28, a keyboard 30, a fixed disk drive 32 and a floppy disk drive 33 operative to receive a floppy disk 33A. Many other devices may be connected such as a scanner 34 via I/O controller 18, a mouse 36 connected to serial port 28 or a network interface 40. Many other devices or subsystems (not shown) may be connected in a similar manner. Also, it is not necessary for all of the devices shown in FIG. 1 to be present to practice the present invention, as discussed below. The devices and subsystems may be interconnected in different ways from that shown in FIG. 1. The operation of a computer system such as that shown in FIG. 1 is readily known in the art and is not discussed in detail in the present application. Source code to implement the present invention may be operably disposed in system memory 16 or stored on storage media such as a fixed disk 32 or a floppy disk 33A. Image information may be stored on fixed disk 32.

Annotated Document Printing User Interface

Figure 2:
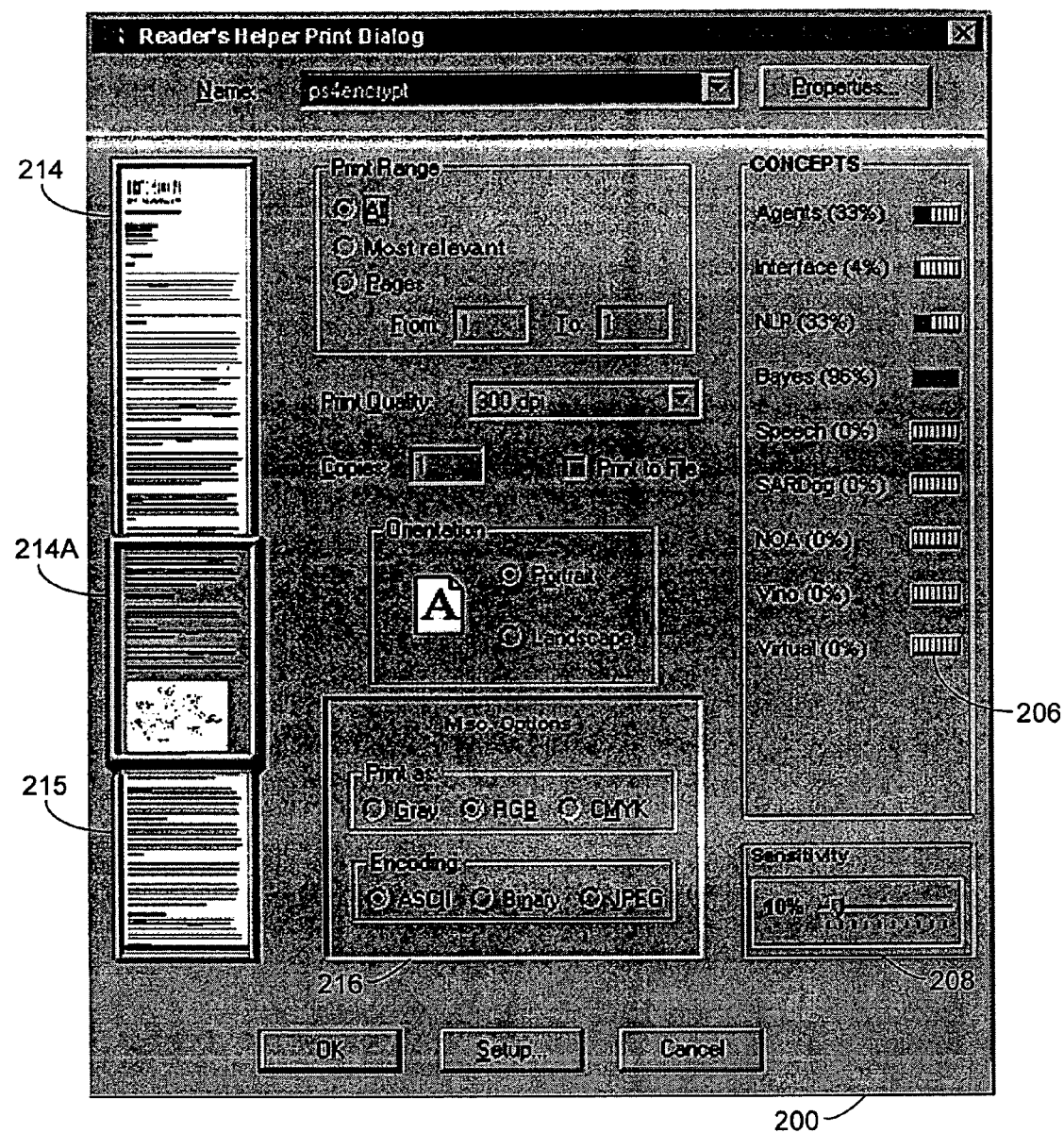
FIG. 2 depicts a representative document printing dialog in accordance with a particular embodiment of the present invention.

FIG. 2 depicts a representative user interface 200 in accordance with a particular embodiment of the invention. The representative user interface of FIG. 2 includes a print dialog 200 which provides the user with the capability to control the printing of an annotated document. As will be explained further below, an automatic annotation system according to the present invention adds annotations to any document available in electronic form. The document need not include any special information to assist in locating discussion of concepts of interest. These annotations denote text relevant to user-selected concepts. The print dialog 200 enables the user to obtain printed copy of sections of an electronically stored document having the greatest relevance to the concepts of interest to the user.

An elongated thumbnail image 214 of many pages, or all of an electronically stored document 502 is presented in viewing area 215. Elongated thumbnail image 214 provides a convenient view of the basic document structure. The annotations incorporated into the document are visible within elongated thumbnail image 214. Within elongated thumbnail image 214, an emphasized area 214A shows a highlighted view of a portion of 502 the document. Thus, a user 504 may change the window size, causing emphasized area 214A to change in size accordingly. The greater the viewing area allocated to elongated thumbnail image 214 and emphasized area 214A, the more detail is visible. With very small allocated viewing areas, only sections of the document may be distinguishable. As the allocated area increases, individual lines and eventually individual words become distinguishable. Emphasized viewing area 214A may be understood to be a lens or a viewing window over the part of elongated thumbnail image 214 corresponding to the document section of greatest interest to user 504. User 504 may scroll through elongated thumbnail 214 by sliding emphasized area 214A through elongated thumbnail 214 using mouse 36 or keys on keyboard 30. As emphasized area 214A shifts, the section of document 502 displayed in elongated thumbnail visible through emphasized area 214A will also shift.

The elongated thumbnail image 214 in FIG. 2 displays each page of document 502 as being displayed at the same reduced scale. In FIG. 2, the user-configured ratio is approximately 6:1. The present invention also contemplates other modes of scaling elongated thumbnail image 214. For example, one may display emphasized area 214A at a scale similar to that shown in FIG. 2 and use a variable scale for the rest of elongated thumbnail image 214. Text from far away emphasized area 214A would be displayed at a highly reduced scale and the degree of magnification would increase with nearness to emphasized area 214A.

The annotations in elongated thumbnail image 214 make it very easy to find relevant text anywhere in document 502. Furthermore, elongated thumbnail image 214 provides a highly useful way of keeping track of a lengthy document. These features enable the user 504 to readily locate portions of the document for printing.

A series of concept indicators 206 permit the user to view which concepts of interest are to be noted in the document. Concepts are defined by means of a defined concepts list 806, which lists all of the concepts which have been added to a user profile. By selecting a concept add button 808, the user may add a new concept. The user profile is discussed below in greater detail.

A sensitivity control 208 permits the user to select the degree of sensitivity to apply in identifying potential locations of relevant discussion for printing. At low sensitivity, more locations will be denoted as being relevant, even though some may not be of any actual interest. At high sensitivity, most all denoted locations will in fact be relevant but some other relevant locations may be missed. After each concept name appearing by one of concept indicators 206 appears a percentage giving the relevance of the currently viewed document to the concept. These relevance levels offer a quick assessment of the relevance of the document to the selected concepts.

Miscellaneous printing options are found on a printing options button bar 216.

Printing Assistance

Figure 3:
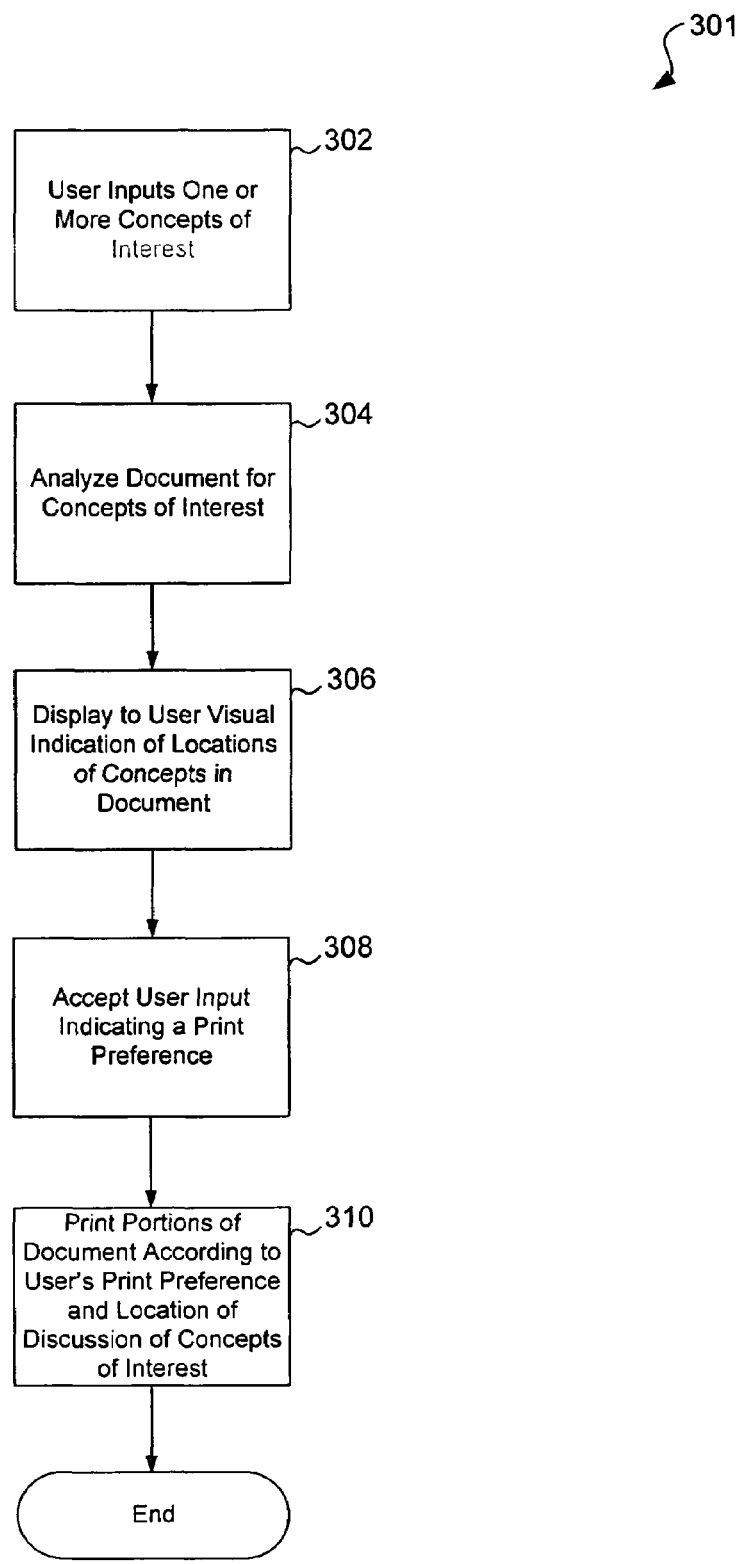
FIG. 3 depicts a simplified flowchart of representative process steps in accordance with a specific embodiment of the invention.

FIG. 3 depicts a representative flowchart 301 of simplified process steps in a particular embodiment of the computer-implemented method for controlling printing of an electronically stored document according to the present invention. In a step 302, user input indicating user-specified concepts of interest is accepted. Then, in a step 304, the electronically stored document 504 is analyzed in order to identify locations of discussion of the user-specified concepts of interest input in step 302. The analysis step 304 is detailed in FIG. 5 and the accompanying text below. Next, in a step 306, visual indications of the locations identified in step 304 are displayed to the user. In a step 308, user input indicating a print preference among the locations identified in step 304 is accepted. Finally, in a step 310, portions of the electronic document corresponding to the user's print preference and the locations discussing the user's concepts of interest are printed.

Figure 4:
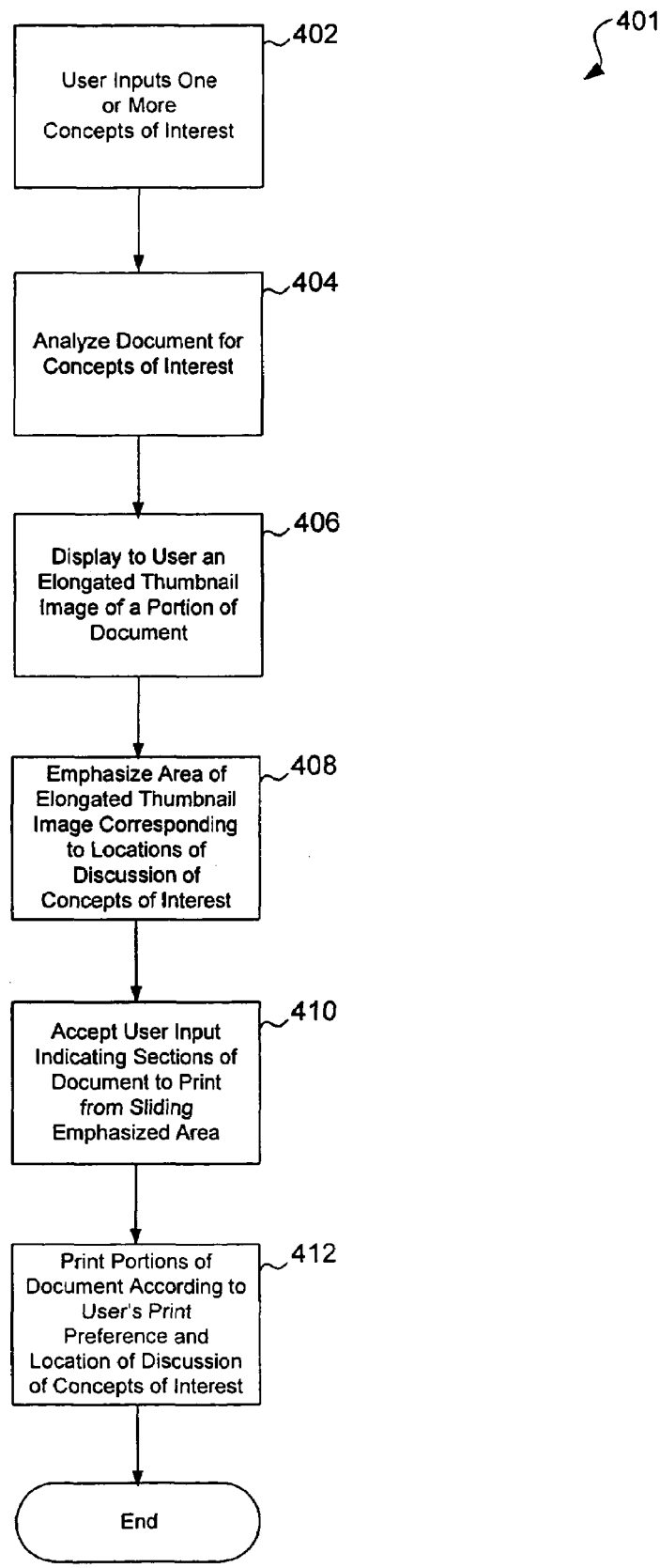
FIG. 4 depicts a simplified flowchart of representative process steps in accordance with an alternative embodiment of the invention.

FIG. 4 depicts a representative flowchart 401 of simplified process steps in a particular embodiment of the computer-implemented method for controlling printing of an electronically stored document according to the present invention. In a step 402, user input indicating user-specified concepts of interest is accepted. Then, in a step 404, the electronically stored document 504 is analyzed in order to identify locations of discussion of the user-specified concepts of interest input in step 402. Next, in a step 406, visual indications of the locations identified in step 404 are displayed to the user 504 by means of an elongated thumbnail image of a portion of the electronically stored document 502 in a viewing area of a display. Then, in a step 408, an area of a thumbnail image corresponding to a section of interest of electronically stored document 502 is emphasized in order to form an emphasized area. In a step 410, input from user 504 controlling sliding of the emphasized area formed in step 408 through the thumbnail image is accepted for the purpose of indicating sections of electronically stored document 504 to print. Finally, in a step 412, portions of the electronic document corresponding to the user's print preference and the locations discussing the user's concepts of interest are printed.

In a particular embodiment, user 504 uses a sensitivity control 208 to select the degree of sensitivity to apply in identifying potential locations of relevant discussion. At low sensitivity, more locations will be denoted as being relevant, even though some may not be of any actual interest. At high sensitivity, most all denoted locations will in fact be relevant but some other relevant locations may be missed.

Automatic Annotation Software

Figure 5:
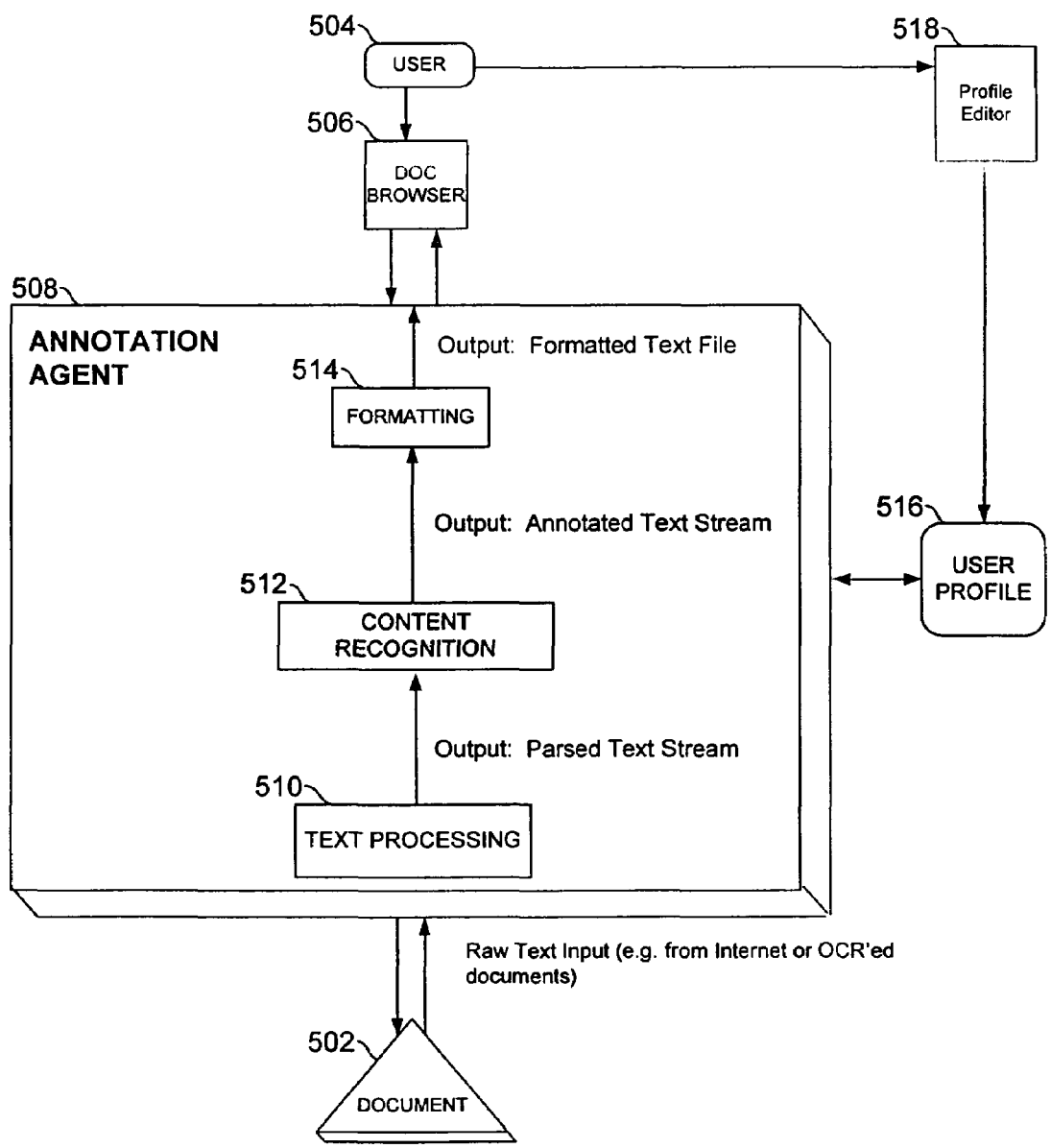
FIG. 5 depicts a top-level software architectural diagram for automatic annotation in accordance with one embodiment of the present invention.

FIG. 5 depicts a top-level software architectural diagram for analyzing electronically stored document 502 in accordance with step 304 of FIG. 3 and step 404 of FIG. 4. The method for analyzing electronically stored document 502 is more fully detailed in a commonly owned copending U.S. patent application Ser. No. 08/995,616, entitled AUTO-MATIC ADAPTIVE DOCUMENT HELP SYSTEM, which is incorporated herein by reference in its entirety for all purposes. Document 502 is stored in an electronic format. It may have been scanned in originally. It may be, e.g., in HTML, Postscript, LaTeX, other word processing or e-mail formats, etc. The description that follows assumes an HTML format. However, other formats may be used without departing from the scope of the present invention. A user 504 accesses document 502 through a document browser 506, an annotation agent 508 or elongated thumbnail 214 of printing dialog 200. Document browser 506 is preferably a hypertext browsing program such as Netscape Navigator or Microsoft Explorer but also may be, e.g., a conventional word processing program.

Annotation agent 508 adds the annotations to document 502 to prepare it for viewing by document browser 506 and printing by printing dialog 200. Processing by annotation agent 508 may be understood to be in three stages, a text processing stage 510, a content recognition stage 512, and a formatting stage 514. The input to text processing stage 510 is raw text. The output from text processing stage 510 and input to content recognition stage 512 is a parsed text stream, a text stream with formatting information such as special tags around particular words or phrases removed. The output from content recognition stage 512 and input to formatting stage 514 is an annotated text stream. The output of formatting stage 514 is a formatted text file which may be printed using print dialog 200 or viewed with document browser 506.

The processing of annotation agent 508 is preferably a run-time process. The annotations are not preferably pre-inserted into the text but are rather generated when user 504 requests document 502 for browsing. Thus, this is preferably a dynamic process. Annotation agent 508 may also, however, operate in the background as a batch process.

The annotation added by annotation agent 508 depends on concepts of interest selected by user 504. User 504 also inputs information used by annotation agent 508 to identify locations of discussion of concepts of interest in document 502. In a preferred embodiment, this information defines the structure of a Bayesian belief network. The concepts of interest and other user-specific information are maintained in a user profile file 516. User 504 employs a profile editor 518 to modify the contents of user profile file 516.

Figure 6A:
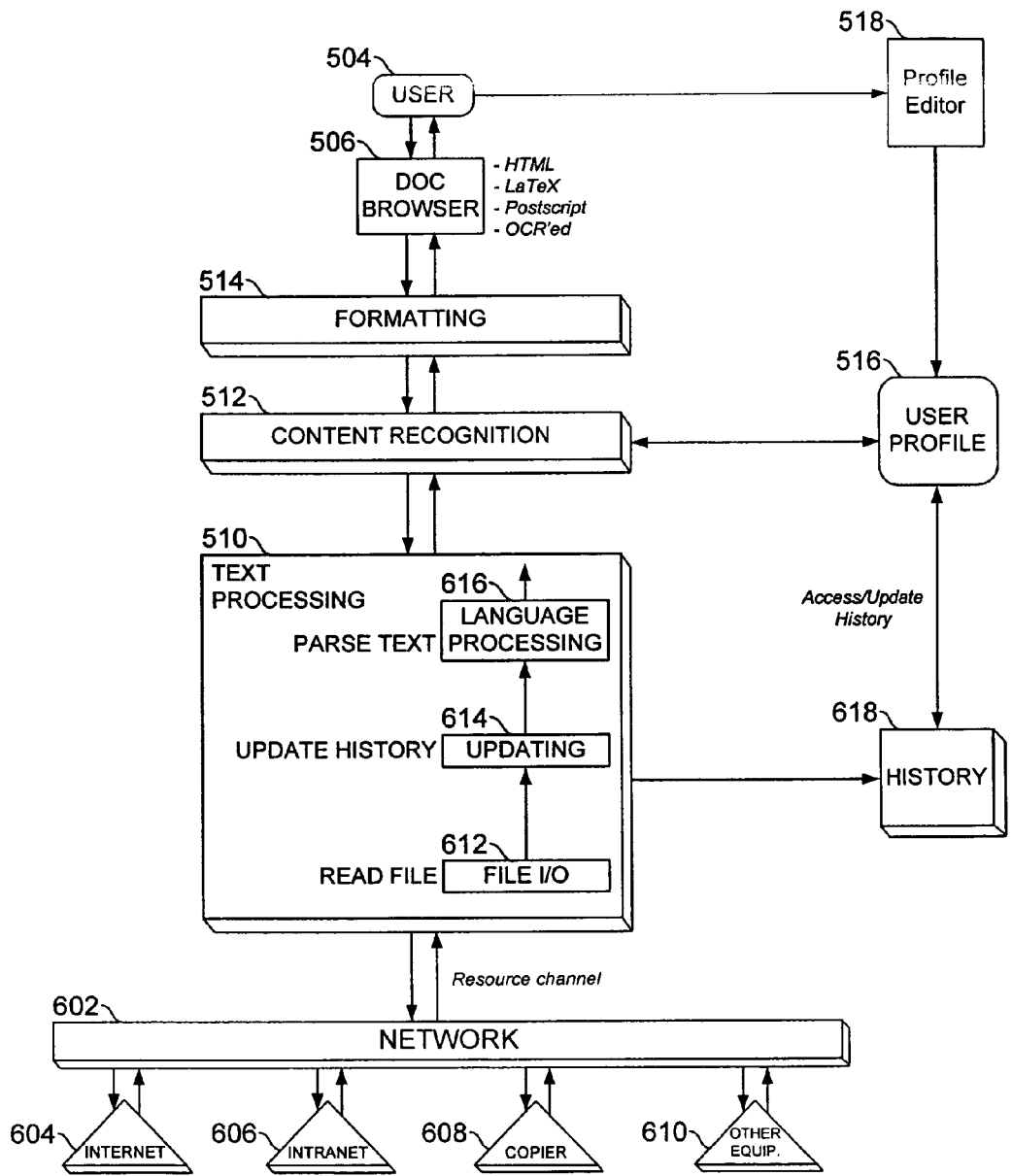
FIGS. 6A–6C depict a detailed software architectural diagram for automatic annotation in accordance with one embodiment of the present invention.

FIG. 6A depicts the automatic annotation software architecture of FIG. 5 with text processing stage 510 shown in greater detail. FIG. 6A shows that the source of document 502 may be accessed via a network 602. Possible sources include e.g., the Internet 604, an intranet 606, a digital copier 608 that captures document images, or other office equipment 610 such as a fax machine, scanner, printer, etc. Another alternative source is the user's own hard drive 32.

Text processing stage 510 includes a file I/O stage 612, an updating stage 614, and a language processing stage 616. File I/O stage reads the document file from network 602. Updating stage 614 maintains a history of recently visited documents in a history file 618. Language processing stage 616 parses the text of document 502 to generate the parsed text output of text processing stage 510.

Figure 6B:
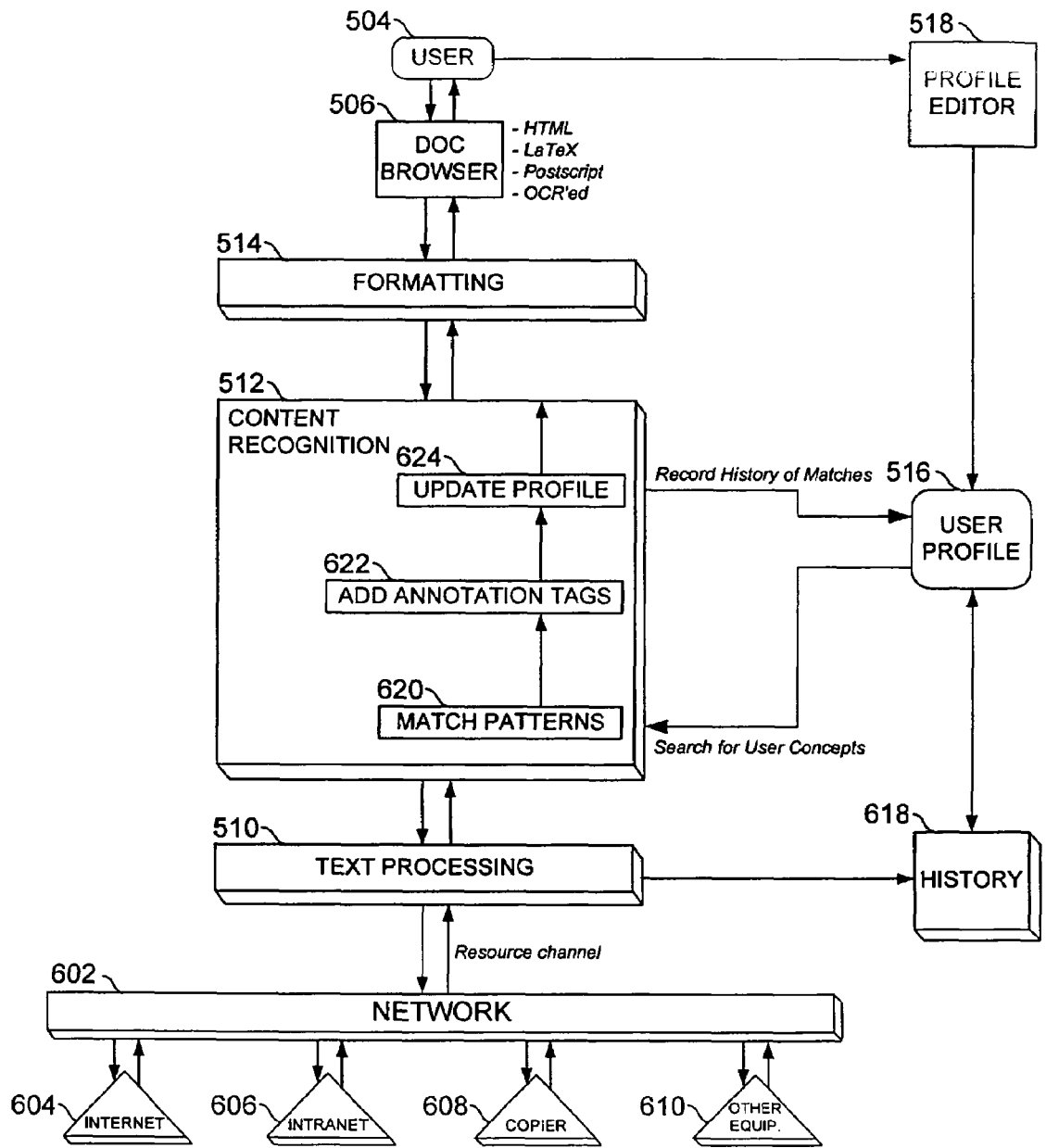

FIG. 6B depicts the automatic annotation software architecture of FIG. 5 with content recognition stage 512 shown in greater detail. A pattern identification stage 620 looks for particular patterns in the parsed text output of text processing stage 510. The particular patterns searched for are determined by the contents of user profile file 516. Once the patterns are found, annotation tags are added to the parsed text by an annotation tag addition stage 622 to indicate the pattern locations. In a preferred HTML embodiment, these annotation tags are compatible with the HTML format. However, the tagging process may be adapted to LaTeX, Postscript, etc. A profile updating stage 624 monitors the output of annotation tag addition stage 622 and analyzes text surrounding the locations of concepts of interest. As will be further discussed with reference to FIG. 7, profile updating stage 624 changes the contents of user profile file 516 based on the analysis of this surrounding text. The effect is to automatically refine the patterns searched for by pattern identification stage 620 to improve annotation performance.

Figure 6C:
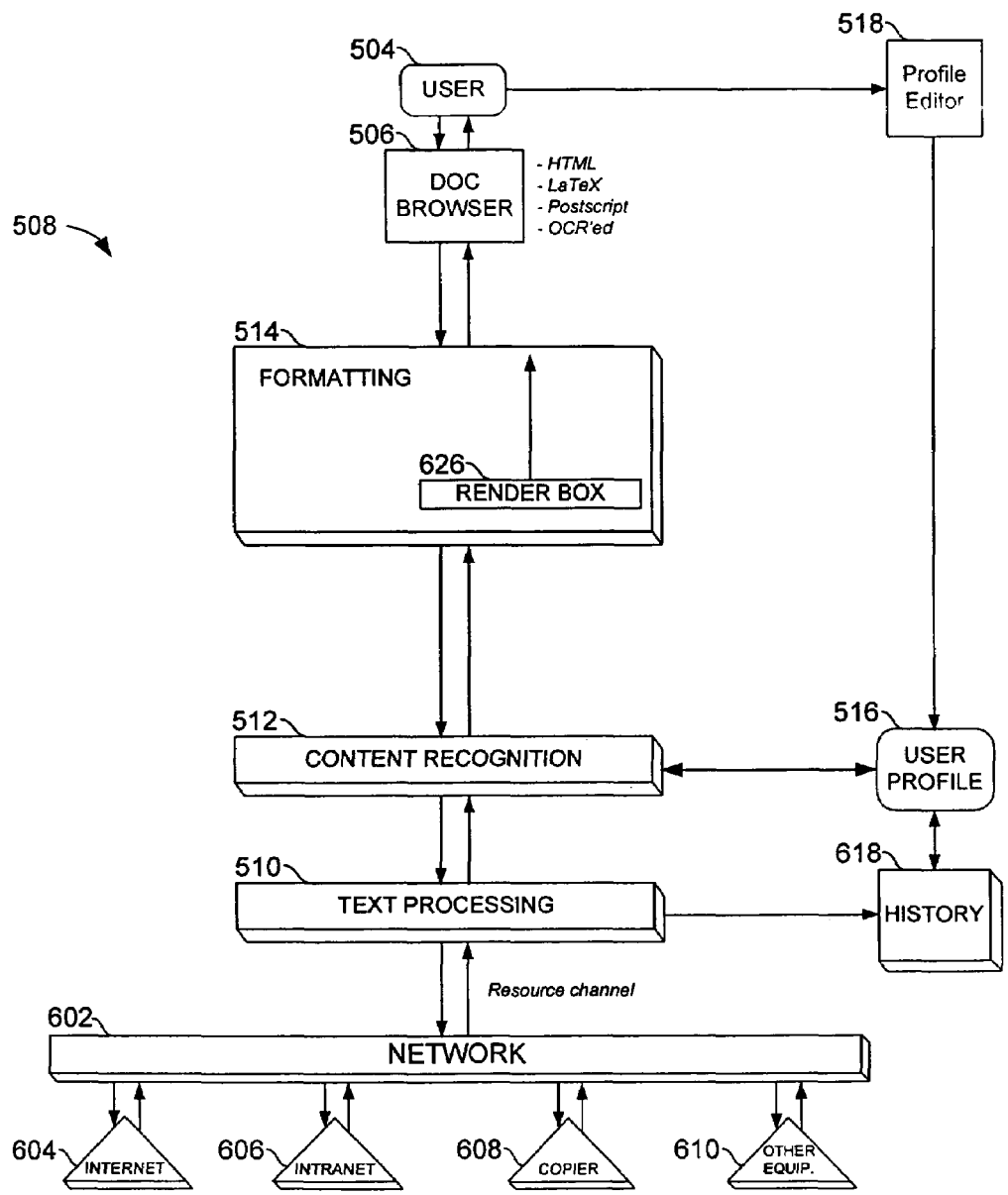

FIG. 6C depicts the automatic annotation software architecture of FIG. 5 with formatting stage 514 shown in greater detail. Formatting stage 514 includes a text rendering stage 626 that formats the annotated text provided by content recognition stage 512 to facilitate viewing by document browser 506 and printing by print dialog 200.

Pattern identification stage 620 looks for keywords and key phrases of interest and locates relevant discussion of concepts based on the located keywords. The identification of keywords and the application of the keywords to locating relevant discussion is preferably accomplished by reference to a belief system. The belief system is preferably a Bayesian belief network.

Figure 7:
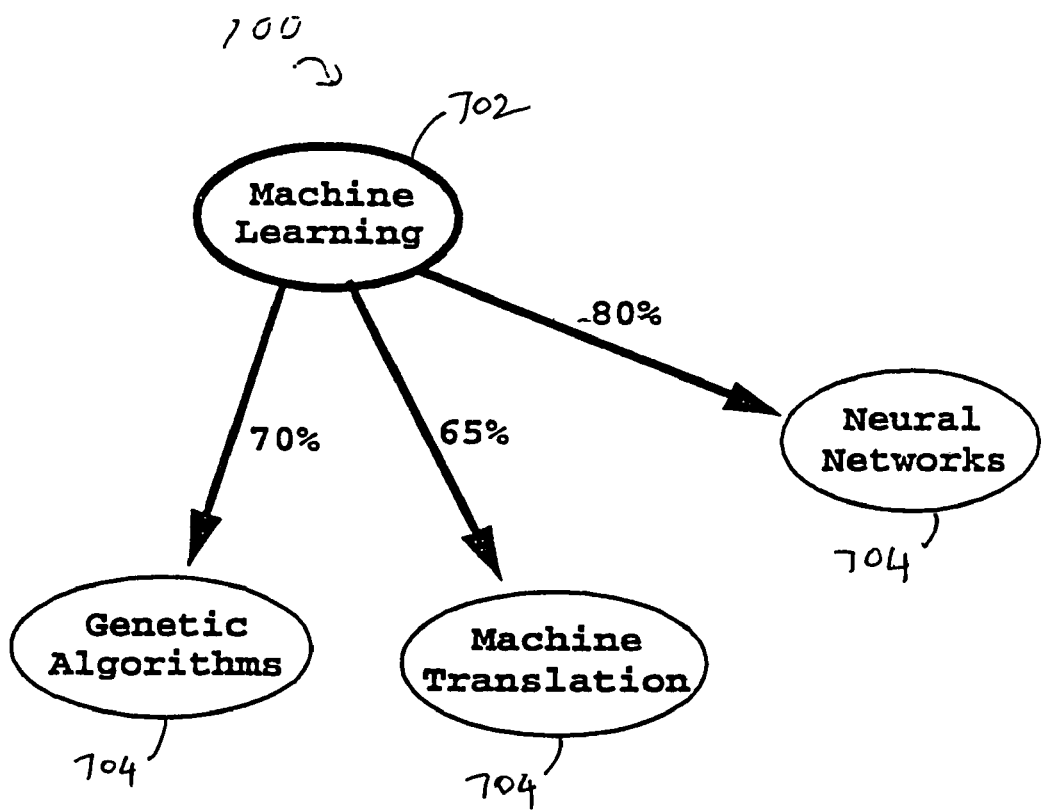
FIG. 7 depicts a representative Bayesian belief network useful in automatic annotation in accordance with one embodiment of the present invention.

FIG. 7 depicts a portion of a representative Bayesian belief network 700 implementing a belief system as used by pattern identification stage 622. A first oval 702 represents a particular user-specified concept of interest. Other ovals 704 represent subconcepts related to the concept identified by oval 702. Each line between one of subconcept ovals 704 and concept oval 702 indicates that discussion of the subconcept implies discussion of the concept. Each connection between one of subconcept ovals 704 and concept oval 702 has an associated probability value indicated in percent. These values in turn indicate the probability that the concept is discussed given the presence of evidence indicating the presence of the subconcept. Discussion of the subconcept is in turn indicated by one or more keywords or key phrases (not shown in FIG. 7).

The structure of Bayesian belief network 700 is only one possible structure applicable to the present invention. For example, one could employ a Bayesian belief network with more than two levels of hierarchy so that the presence of subconcepts is suggested by the presence of "subsubconcepts" and so on. In the preferred embodiment, presence of a keyword or key phrase always indicates presence of discussion of the subconcept but it is also possible to configure the belief network so that presence of a keyword or key phrase suggests discussion of the subconcept with a specified probability.

The primary source for the structure of Bayesian belief network 700 including the selection of concepts, keywords and key phrases, interconnections, and probabilities is user profile file 516. In a preferred embodiment, user profile file 516 is selectable for both editing and use from among profiles for many users.

The structure of belief system 700 is modifiable during use of the annotation system. The modifications may occur automatically in the background or may involve explicit user feedback input. The locations of concepts of interest determined by pattern identification stage 620 are monitored by profile updating stage 624. Profile updating stage 624 notes the proximity of other keywords and key phrases within each analyzed document to the locations of concepts of interest. If particular keywords and key phrases are always near a concept of interest, the structure and contents of belief system 700 are updated in the background without user input by profile updating stage 624. This could mean changing probability values, introducing a new connection between a subconcept and concept, or introducing a new keyword or key phrase.

User 504 may select a word or phrase in document 502 as being relevant to a particular concept even though the word or phrase has not yet defined to be a keyword or key phrase. Belief system 700 is then updated to include the new keyword or key phrase User 504 may also give feedback for an existing key word or key phrase, indicating the perceived relevance of the keyword or key phrase to the concept of interest. If the selected keyword or key phrase is indicated to be of high relevance to the concept of interest, the probability values connecting the subconcept indicated by the selected keywords or key phrases to the concept of interest increases. If, on the other hand, user 504 indicates the selected keywords or key phrases to be of little interest, the probability values connecting these keywords or key phrases to the concept decrease.

User Profile and Feedback Interfaces

Figure 8:
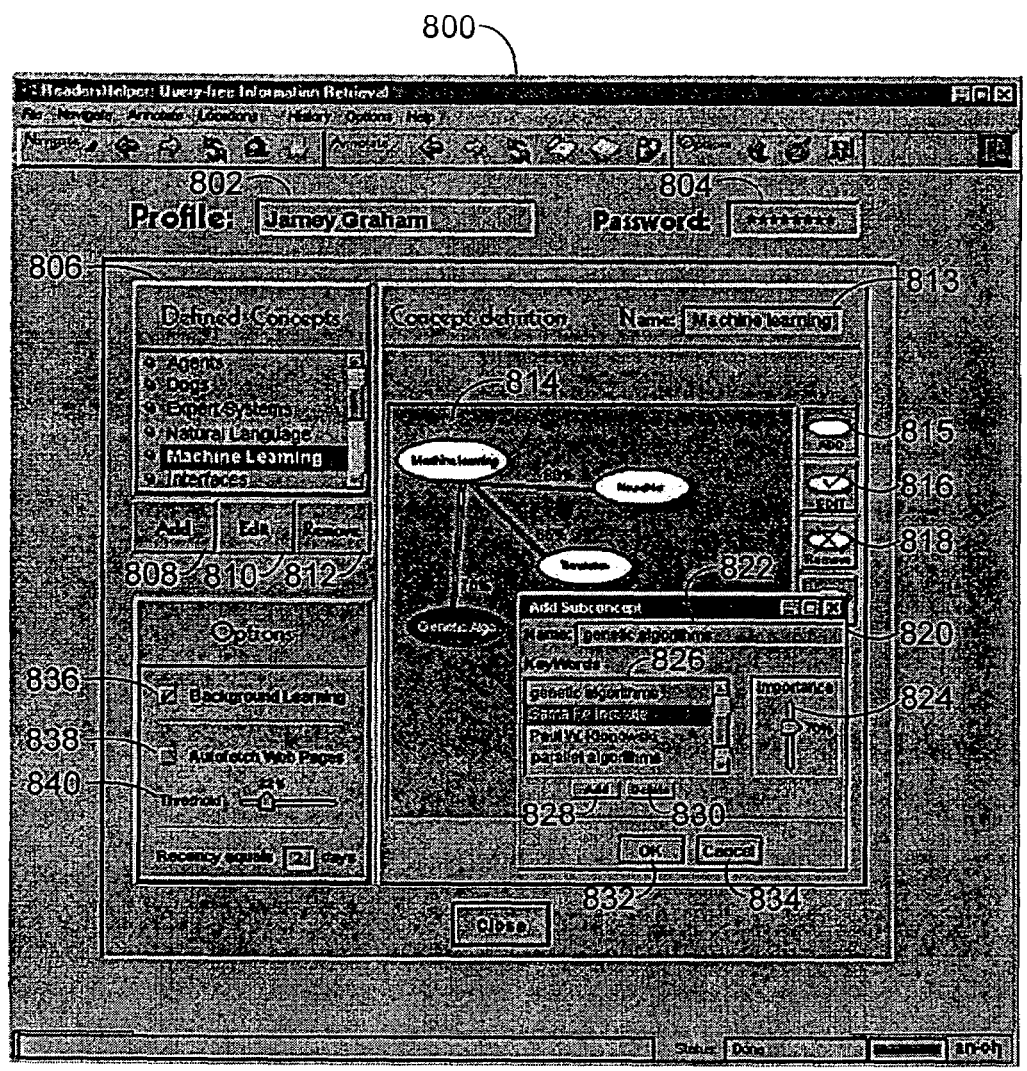
FIG. 8 depicts a user interface for defining a user profile in accordance with one embodiment of the present invention.

FIG. 8 depicts a user interface for defining a user profile in accordance with one embodiment of the present invention. User interface screen 800 is provided by profile editor 518. A profile name box 802 permits the user to enter the name of the person or group to whom the profile to be edited is assigned. This permits the annotation system according to the present invention to be personalized to particular users or groups. A password box 804 provides security by requiring entry of a correct password prior to profile editing operations.

A defined concepts list 806 lists all of the concepts which have already been added to the user profile. By selecting a concept add button 808, the user may add a new concept. By selecting a concept edit button 810, the user may modify the belief network as it pertains to the listed concept that is currently selected. By selecting a remove button 812, the user may delete a concept.

If a concept has been selected for editing, its name appears in a concept name box 813. The portion of the belief network pertaining to the selected concept is shown in a belief network display window 814. Belief network display window 814 shows the selected concept, the subconcepts which have been defined as relating to the selected concept and the percentage values associated with each relationship. The user may add a subconcept by selecting a subconcept add button 815. The user may edit a subconcept by selecting the subconcept in belief network display window 814 and then selecting a subconcept edit button 816. A subconcept remove button 818 permits the user to delete a subconcept from the belief network.

Selecting subconcept add button 815 causes a subconcept add window 820 to appear. Subconcept add window 820 includes a subconcept name box 822 for entering the name of a new subconcept. A slider control 824 permits the user to select the percentage value that defines the probability of the selected concept appearing given that the newly selected subconcept appears. A keyword list 826 lists the keywords and key phrases which indicate discussion of the subconcept. The user adds to the list by selecting a keyword add button 828 which causes display of a dialog box (not shown) for entering the new keyword or key phrase. The user deletes a keyword or key phrase by selecting it and then selecting a keyword delete button 830. Once the user has finished defining the new subconcept, he or she confirms the definition by selecting an OK button 832. Selection of a cancel button 834 dismisses subconcept add window 820 without affecting the belief network contents or structure. Selection of subconcept edit button 816 causes display of a window similar to subconcept add window 820 permitting redefinition of the selected subconcept.

By determining whether a background learning checkbox 836 has been selected, the user may enable or disable the operation of profile updating stage 624. A web autofetch check box 838 permits the user to select whether or not to enable an automatic web search process. When this web search process is enabled, whenever a particular keyword or key phrase is found frequently near where a defined concept is determined to be discussed, a web search tool such as AltaVista™ is employed to look on the World Wide Web for documents containing the keyword or key phrase. A threshold slider control 840 is provided to enable the user to set a threshold relevance level for this autofetching process.

Figure 9A:
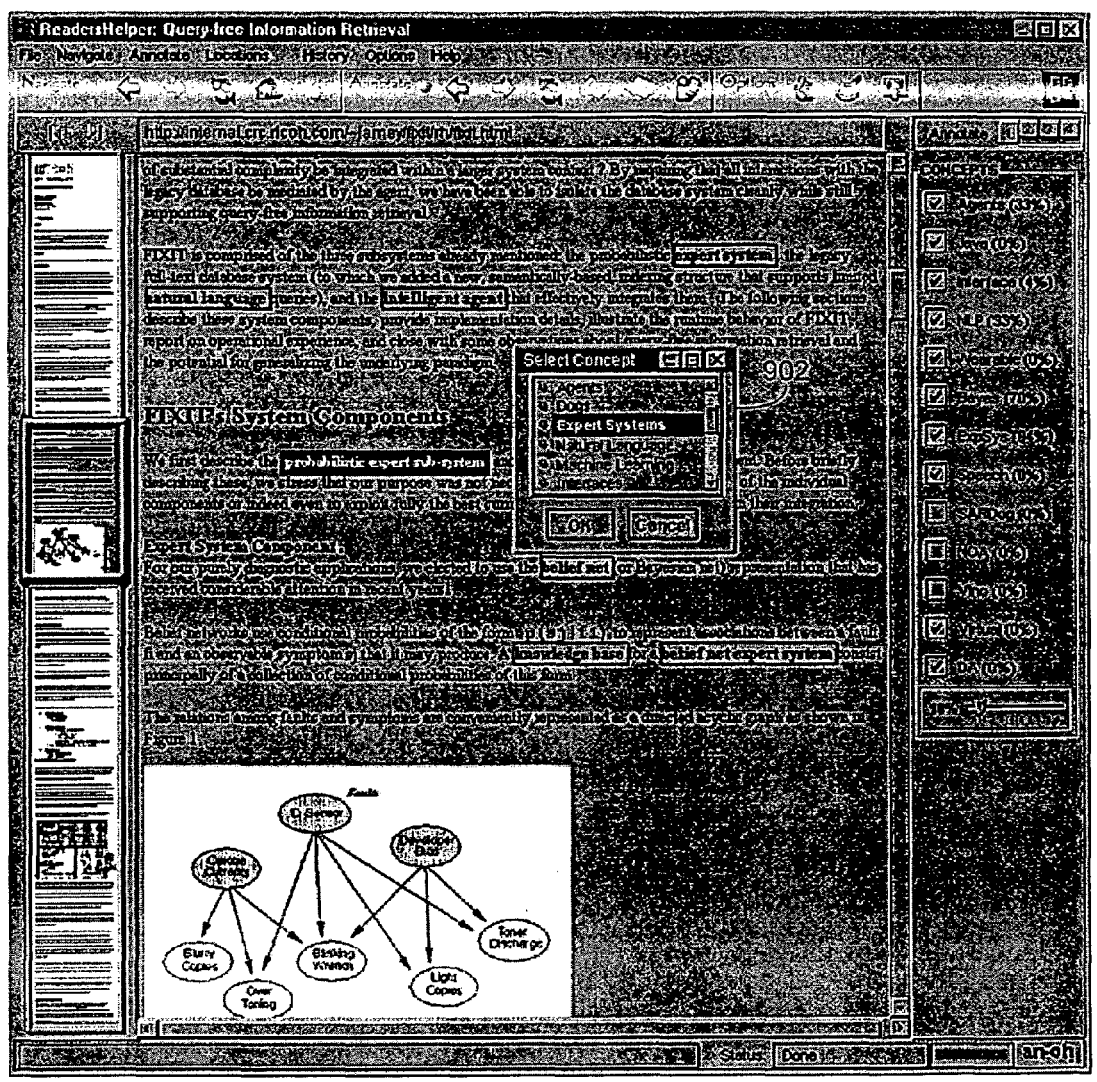
FIGS. 9A–9B depict an interface for providing user feedback in accordance with one embodiment of the present invention.
Figure 9B:
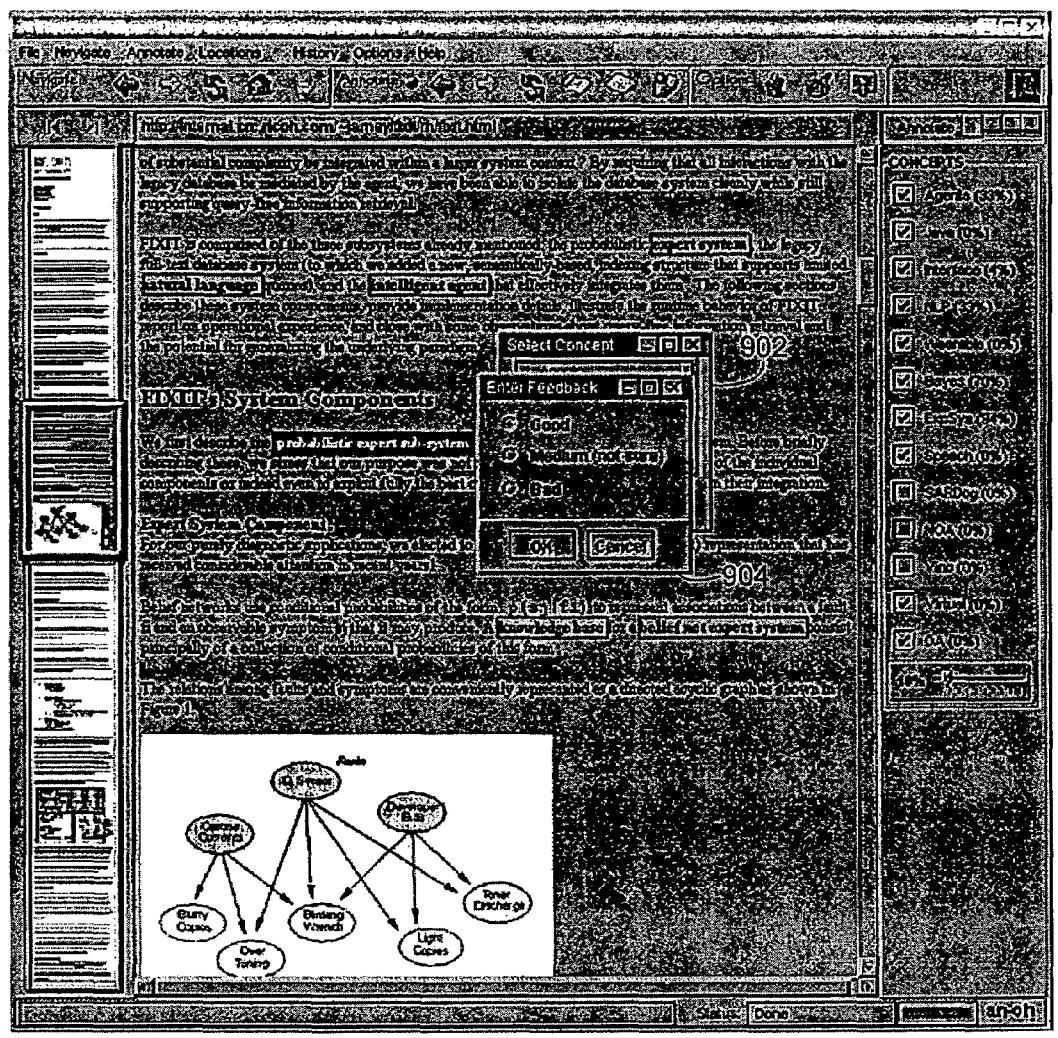

FIGS. 9A–9B depict a user interface for providing feedback in accordance with one embodiment of the present invention. User 504 may select any text and call up a first feedback window 902. The text may or may not have been previously identified by the annotation system as relevant. In first feedback window 902 shown in FIG. 9A, user 504 may indicate the concept to which the selected text is relevant. First feedback window 902 may not be necessary when adjusting the relevance level for a keyword or key phrase that is already a part of belief network 700. After the user selects a concept in first feedback window 902, a second feedback window 904 is displayed for selecting the degree of relevance. Second feedback window 904 in FIG. 9B provides three choices for level of relevance: good, medium (not sure), and bad. Alternatively, a slider control could be used to set the level of relevance. If the selected text is not already a keyword or key phrase in belief network 700, a new subconcept is added along with the associated new keyword or key phrase. If the selected text is already a keyword or key phrase, above, probability values within belief system 700 are modified appropriately in response to this user feedback.

FIG. 10 depicts a portion of an HTML document 1000 processed in accordance with one embodiment of the present invention. A sentence including relevant text is preceded by an a <RH.ANOH.S . . . > tag 1002 and followed by an </RH.ANOH.S> tag 1004. The use of these tags facilitates the annotation mode where complete sentences are highlighted. The <RH.ANOH.S . . . > tag 1002 includes a number indicating which relevant sentence is tagged in order of appearance in the document. Relevant text within a so-tagged relevant sentence is preceded by an <RH.ANOH . . . > tag 1006 and followed by an </RH.ANOH> tag 1008. The <RH.ANOH . . . > 1006 tag include the names of the concept and subconcept to which the annotated text is relevant, an identifier indicating which relevant sentence the text is in and a number which identifies which annotation this is in sequence for a particular concept. An HTML browser that has not been modified to interpret the special annotation tags provided by the present invention will ignore them and display the document without annotations.

Software Implementation

In a preferred embodiment, software to implement the present invention is written in the Java language. Preferably, the software forms a part of a stand-alone browser program written in the Java language. Alternatively, the code may be in the form of a so-called "plug-in" operating with a Java-equipped web browser used to browse HTML documents including the special annotation tags explained above.

In the foregoing specification, the invention has been described with reference to specific exemplary embodiments thereof. For example, any probabilistic inference method may be substituted for a Bayesian belief network. It will, however, be evident that various modifications and changes may be made thereunto without departing from the broader spirit and scope of the invention as set forth in the appended claims and their full scope of equivalents.

What is claimed is:

1. A computer-implemented method for controlling printing of an electronically stored document comprising:

receiving a user input requesting the electronically stored document;

in response to the user input, determining a plurality of concepts of interest associated with the user;

determining, from the plurality of determined concepts of interest, at least one of a plurality of keywords relating the concepts of interest to contents of the electronically stored document;

analyzing the electronically stored document to identify locations of discussion of the plurality of concepts of interest in the electronically stored document, wherein the identified locations comprise a first location of discussion corresponding to a first concept of interest and a second location of discussion corresponding to a second concept of interest;

displaying visual indications of the identified locations;

receiving user input requesting printing the locations of discussion of the plurality of concepts of interest in the electronically stored document; and in response to the user input, printing portions of the electronically stored document comprising the locations of discussion of the plurality of concepts of interest in the electronically stored document, wherein the printed portions of the electronically stored document comprise the first location of discussion and the second location of discussion.

2. The method of claim 1, further comprising outputting an interface that is configured to receive the user input requesting the electronically stored document.

3. The method of 2, wherein the outputted interface is included in an Internet browser.

* * * * *